United States Patent [19]

Stender

[11] Patent Number: 5,468,139
[45] Date of Patent: Nov. 21, 1995

[54] HEATING ENCLOSURE WITH A THERMOFORMING INSERT

[75] Inventor: Adolf Stender, Duderstadt, Germany

[73] Assignee: Otto Bock Orthopaedische Industrie Besitz- und Verwaltungs-KG, Duderstadt, Germany

[21] Appl. No.: 240,366

[22] Filed: May 10, 1994

[30] Foreign Application Priority Data

May 10, 1993 [DE] Germany ............................ 9307066 U

[51] Int. Cl.$^6$ ..................................................... B29C 51/42
[52] U.S. Cl. .......................... 425/383; 264/544; 425/384
[58] Field of Search ..................................... 425/383, 384; 264/544

[56] References Cited

U.S. PATENT DOCUMENTS

| | | | |
|---|---|---|---|
| 3,728,799 | 4/1973 | Streltsov | 425/383 |
| 3,811,815 | 5/1974 | Sundermann et al. | 425/383 |
| 3,907,480 | 9/1975 | Renoux | 425/383 |

FOREIGN PATENT DOCUMENTS

| | | |
|---|---|---|
| 2458372 | 1/1981 | France . |
| 8814901 | 5/1990 | Germany . |

*Primary Examiner*—Tim Heitbrink
*Attorney, Agent, or Firm*—Foley & Lardner

[57] ABSTRACT

A heating enclosure for the production of thermoformed plastic shanks having a relatively uniform wall thickness, in particular for the production of prostheses, is provided. The enclosure has the following features: a) a thermoforming insert (11) which can be fixed upright in the enclosure interior space (3) and is approximately funnel-shaped in design; b) the thermoforming insert (11) is designed as an air-guidance device, its lower opening, with the smallest diameter, defining the air-inlet cross-section and it upper opening, with the largest diameter, defining the air-outlet cross-section; and c) the thermoforming insert (11) has, directly above its upper air-outlet opening, a sheet receiver (15) for the approximately horizontal reception of a plastic sheet (17) to be thermoformed; d) an air guidance mechanism (4, 5, 6) which guides the air in a closed circuit and has at least one upper air-extraction opening (5) which extracts from the enclosure interior space (3), in particular the air emerging from the thermoforming insert (11), and to which an air-recirculation duct (4) arranged outside the enclosure interior space (3) is connected, which air-recirculation duct has an air-recirculation fan (7) and a heater (8) heating the extracted air and is connected to at least one lower air-blow-in opening (6) leading into the enclosure interior space (3).

6 Claims, 1 Drawing Sheet

HEATING ENCLOSURE WITH A THERMOFORMING INSERT

BACKGROUND OF THE INVENTION

1. Field of the Invention

The invention relates to a heating enclosure for producing thermoformed plastic shanks, particularly for producing prostheses.

2. Description of Related Art

It is known to thermoform a plastic sheet by clamping it in a frame or the like and subjecting it to hot air in a heating enclosure. Thermoformed prosthesis shanks, for example, are produced in this manner.

It has been found that during the thermoforming process, after the plastic sheet has started to soften, a material accumulation occurs in the lower tip region of the shank due to the effect of gravity. This accumulation results in the thermoformed prosthesis shank having an uneven wall thicknesses, with the wall in the upper edge region being thinnest.

SUMMARY OF THE INVENTION

One object of the invention is to provide a heating enclosure in which thermoformed plastic shanks, particularly prosthesis shanks can be produced having a relatively uniform wall thickness.

In accomplishing the foregoing object, there is provided according to the present invention, a heating enclosure, such as a heating cabinet, for producing thermoformed plastic shanks, comprising: (i) an approximately funnel-shaped thermoforming insert which is adapted to be fixed in an upright position in an interior space of the enclosure, wherein the insert is adapted as an air flow guidance device, with the lower opening of the funnel shaped insert having the smallest funnel diameter which defines an air flow inlet, and the upper opening of the funnel shaped insert having the largest funnel diameter which defines an air flow outlet; (ii) a sheet receiver arranged directly above the air flow outlet of the insert, the sheet receiver being structured to receive plastic sheets to be thermoformed in a substantially horizontal configuration; and (iii) an air flow guidance mechanism for guiding air in a closed circuit through the heating enclosure, the air flow guidance mechanism further comprising at least one upper air-extraction opening arranged to extract air from the interior space of the enclosure, an air-recirculation duct arranged outside the interior space of the enclosure and connected to the at least one upper air-extraction opening, an air-recirculation fan arranged in the air-recirculation duct, a heater arranged in the air-recirculation duct for heating the extracted air, and at least one lower air-blow-in opening connected to the air-recirculation duct, the lower air-blow-in opening leading into the enclosure interior space.

Preferably, the heating enclosure further comprises a slide-in unit, which has a recess adapted to receive a thermoforming insert which is inserted into the slide-in unit. The slide-in unit is adapted to slide into the enclosure interior space.

Further objects, features and advantages of the present invention will become apparent from the detailed description of preferred embodiments which follows.

DETAILED DESCRIPTION OF THE PREFERRED EMBODIMENTS

Figure 1:
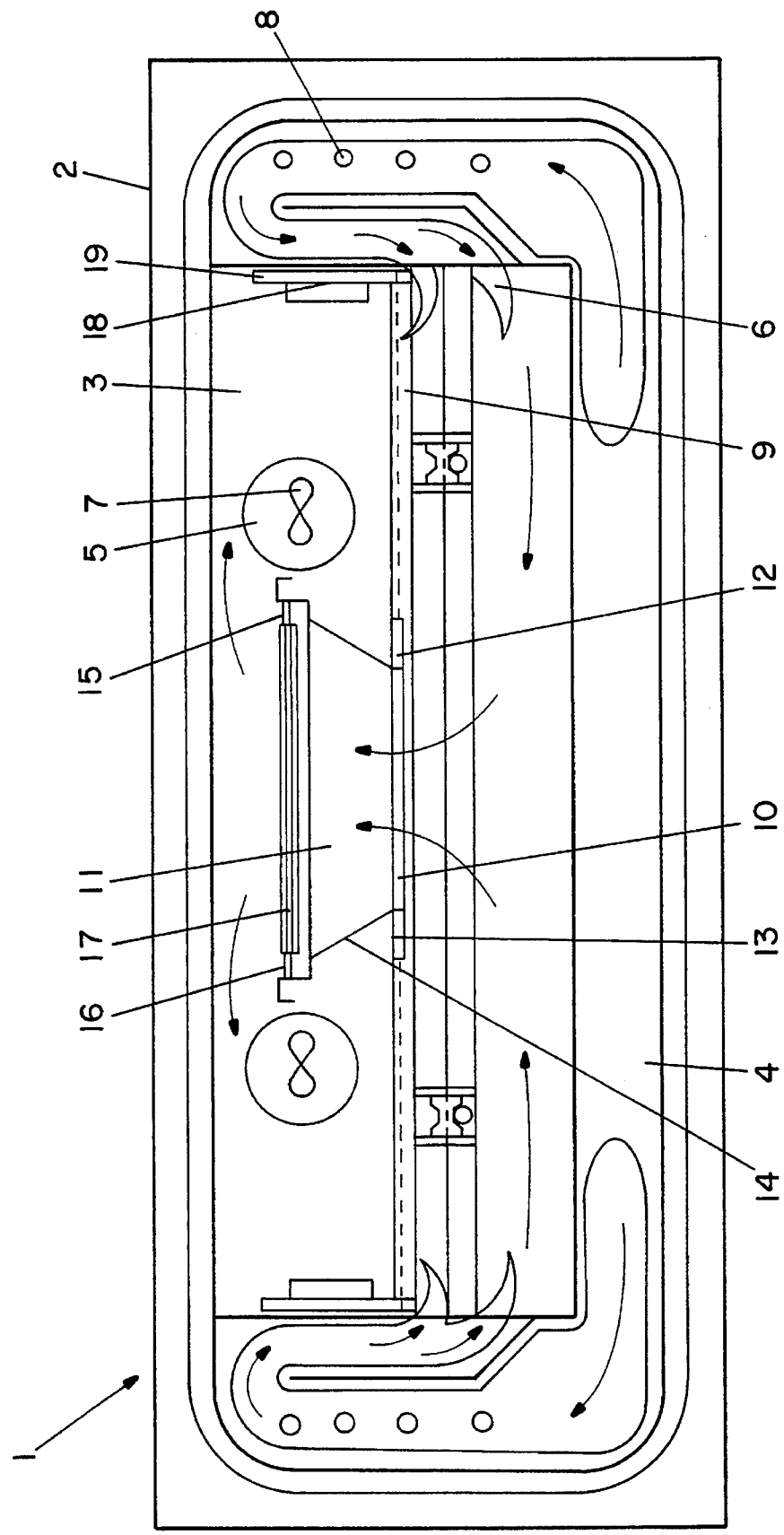
FIG. 1 shows a side sectional view of the heating enclosure apparatus according to the present invention.

The present invention comprises a heating enclosure having the following features:

a) a thermoforming insert which can be fixed upright in the enclosure interior space and which has an approximately funnel-shaped design;

b) the thermoforming insert is designed as an air-guidance device. Its lower opening, with the smallest diameter, defines an air-inlet cross-section and its upper opening, with the largest diameter, defines the air-outlet cross-section;

c) directly above the upper air-outlet opening of the thermoforming insert is a sheet receiver which receives in an approximately horizontal configuration a plastic sheet to be thermoformed; and d) an air guidance device which guides the air in a closed circuit and has at least one upper air-extraction opening which extracts air from the enclosure interior space. Preferably the air guidance device extracts the air emerging from the thermoforming insert. An air-recirculation duct arranged outside the enclosure interior space is connected to the air guidance device. The air-recirculation duct has an air-recirculation fan and a heater heating the extracted air and is connected to at least one lower air-blow-in opening leading into the enclosure interior space.

One feature of the present invention is the air flow provided from bottom to top through the thermoforming insert having an approximately funnel-shaped design. Throughout this description, the phrase "approximately funnel-shaped" denotes a 3-dimensional cylinder that has a diameter at one end larger than the other, i.e., in the shape of a cone. Advantageously, the thermoforming insert is funnel-shaped. This air flow allows the heated air to flow in a targeted manner from the bottom against the plastic sheet to be thermoformed. This air flow causes air to flow uniformly around the sheet material preferably located in a clamping frame and allows the thermoforming process occurring under gravity to take place against the air flow. Experiments have surprisingly shown that in this thermoforming process even wall thicknesses are produced.

It is advantageous if the thermoforming insert is adapted to be inserted into a corresponding recess of a slide-in unit which unit can be slid into the enclosure interior space. This arrangement facilitates the handling of the thermoforming insert.

If the slide-in unit is closed in design except for the corresponding recess, a forced air guidance through the corresponding recess of the slide-in unit occurs. This air guidance is ensured if the air-extraction opening is arranged above and the air-blow-in opening is arranged below the slide-in unit.

The present invention also includes further features which are explained in greater detail in conjunction with further advantages of the invention with reference to an exemplary embodiment.

In FIG. 1, a heating enclosure 1 with an outer housing 2, an inner housing 3 forming the enclosure interior space and an air-recirculation duct 4 arranged between them are shown. The latter is connected to an upper air-extraction opening 5 of the inner housing 3 and leads into a lower air-blow-in opening 6 of the inner housing 3. An air-recirculation fan 7 and a heater 8 heating the extracted air are connected into this air-recirculation duct 4.

Into the inner housing 3 there can be inserted a slide-in unit 9 which is mounted on rollers. The slide-in unit is designed as a continuous metal sheet and has a recess 10 into which a thermoforming insert 11 with a lower fixing ring 12 is inserted. The thermoforming insert 11 has a funnel 14 which enlarges conically upwards from a base plate 13 and at its upper edge merges into a sheet receiver 15. Into this receiver 15, a clamping frame 16 can be inserted, into which a plastic sheet 17 to be thermoformed is clamped.

From the FIGURE, it can be seen that the air extraction opening 5 is arranged above, and the air-blow-in opening 6 is arranged below the slide-in unit 9. This results in the guided air flow which is made clear by arrows. The air extracted from the inner housing 3 via the air-recirculation fan 7 is guided to the heater 8, where it is heated again. The air is then blown below the slide-in unit 9 through the air-blow-in opening 6 back into the inner housing 3, where it flows through the recess 10 of the slide-in unit 9. From the recess 10, the air flows through the lower opening of the thermoforming insert 11 and impinges in a targeted manner against the underside of the clamped-in plastic sheet 17. There the air flows away laterally to be immediately extracted again through the air-extraction opening 5 and is reheated again. Because of this targeted air flow guidance, optimum thermal convection results which ensures a uniform wall thickness of the thermoformed prosthesis shank.

To be able also to use the heating enclosure 1 for other products, for example, for heating large-surface-area plastic sheets, which require simultaneous application of hot air to their top side and bottom side, another air-blow-in opening 18 can also be provided above the slide-in unit 9. The opening 18 can be optionally closed via an air control which is not illustrated in greater detail in the drawing. The diagrammatically illustrated closure mechanism for the opening 18 is identified with the reference number 19. The closure mechanism 19 may be, for example, a perforated grid.

To ensure as uniform as possible flow from bottom to top through the thermoforming insert 11, it is advantageous if two ventilators or air-recirculation fans are provided at a distance from one another on the rear wall of the inner housing 3.

The invention has been described in detail with reference to particularly preferred embodiments. Those skilled in the art will appreciate, however, that various modifications can be made to the present invention without departing from the spirit and scope thereof.

What is claimed is:

1. A heating enclosure for producing thermoformed plastic shanks, comprising:

a) an approximately funnel-shaped thermoforming insert which is adapted to be fixed in an upright position in an interior space of the enclosure, wherein said insert is adapted as an air flow guidance device, said funnel-shaped insert having a lower opening with a first funnel diameter which defines an air flow inlet, said funnel-shaped insert having an upper opening with a second funnel diameter which defines an air flow outlet, said second funnel diameter being larger than said first funnel diameter;

b) a sheet receiver arranged directly above the air flow outlet of said insert, said sheet receiver being structured to receive plastic sheets to be thermoformed in a substantially horizontal configuration; and c) an air flow guidance means for guiding air in a closed circuit through the heating enclosure, said air flow guidance means comprising at least one upper air extraction opening arranged to extract air from said interior space of said enclosure, an air-recirculation duct arranged outside the interior space of the enclosure and connected to the at least one upper air extraction opening, an air recirculation fan arranged in the air-recirculation duct, a heater arranged in the air-recirculation duct, for heating the extracted air, and at least one lower air-blow-in opening connected to the air-recirculation duct, said lower air-blow-in opening leading into said enclosure interior space.

2. The heating enclosure as claimed in claim 1, wherein the at least one upper air-extraction opening is arranged to extract air emerging from the air flow outlet of the funnel shaped insert.

3. The heating enclosure as claimed in claim 1, further comprising a slide-in unit, said slide-in unit having a recess adapted to receive the thermoforming insert which is inserted into the slide-in unit, and said slide-in unit being adapted to slide into the enclosure interior space.

4. The heating enclosure as claimed in claim 3, wherein the at least one upper air-extraction opening is arranged above the slide-in unit and the air-blow-in opening is arranged below the slide-in unit.

5. The heating enclosure as claimed in claim 3, further comprising at least one additional air-blow-in opening and an air control means to control the opening and closing of the at least one additional air-blow-in opening, and wherein the at least one additional air-blow-in opening is arranged above the slide-in unit.

6. The heating enclosure as claimed in claim 1, further comprising a clamping frame fitted with the plastic sheet to be thermoformed, said clamping frame being adapted to be inserted into the sheet receiver of the thermoforming insert.

* * * * *